US010908132B2

(12) United States Patent
Jha et al.

(10) Patent No.: US 10,908,132 B2
(45) Date of Patent: Feb. 2, 2021

(54) REAL-TIME PERFORMANCE AND HEALTH MONITORING OF ICE DETECTOR SYSTEMS AND ESTIMATION OF REMAINING USEFUL LIFE

(71) Applicant: Goodrich Corporation, Charlotte, NC (US)

(72) Inventors: Ashutosh Kumar Jha, Karnataka (IN); Rajesh Sathyanathan, Karnataka (IN)

(73) Assignee: GOODRICH CORPORATION, Charlotte, NC (US)

(*) Notice: Subject to any disclaimer, the term of this patent is extended or adjusted under 35 U.S.C. 154(b) by 148 days.

(21) Appl. No.: 16/292,430

(22) Filed: Mar. 5, 2019

(65) Prior Publication Data
US 2020/0217824 A1  Jul. 9, 2020

(30) Foreign Application Priority Data
Jan. 7, 2019  (IN) .............................. 201911000666

(51) Int. Cl.
*G01N 29/44* (2006.01)
*G01N 29/12* (2006.01)

(52) U.S. Cl.
CPC .......... *G01N 29/4427* (2013.01); *G01N 29/12* (2013.01); *G01N 2291/0251* (2013.01)

(58) Field of Classification Search
CPC ..... G01N 2291/014; G01N 2291/0251; G01N 29/12; G01N 29/4427; Y02E 10/72; B64D 15/20
See application file for complete search history.

(56) References Cited

U.S. PATENT DOCUMENTS

| 3,541,540 | A |   | 11/1970 | Hughes |           |
|-----------|---|---|---------|--------|-----------|
| 4,441,363 | A | * | 4/1984  | Hill ........................ | G01N 29/12 |
|           |   |   |         |        | 340/582   |
| 4,470,123 | A | * | 9/1984  | Magenheim ........... | B64D 15/20 |
|           |   |   |         |        | 702/172   |
| 4,797,660 | A | * | 1/1989  | Rein, Jr. ................. | G08B 19/02 |
|           |   |   |         |        | 244/134 F |
| 4,980,673 | A | * | 12/1990 | Kleven ................... | G08B 19/02 |
|           |   |   |         |        | 244/134 F |
| 5,313,202 | A | * | 5/1994  | Hansman, Jr. ......... | G08B 19/02 |
|           |   |   |         |        | 244/134 R |

(Continued)

OTHER PUBLICATIONS

All Weather Inc, May 2019, Freezing Rain Sensor Model 6495, www.allweatherinc.com, Rev.D.*

(Continued)

*Primary Examiner* — Francis C Gray
(74) *Attorney, Agent, or Firm* — Cantor Colburn LLP

(57) ABSTRACT

Provided are embodiments for a system and method for performing real-time performance and health monitoring of an ice detector system. Embodiments include sensing, by a current sensor, a current parameter of a drive coil of an ice detector circuit, and monitoring a performance and health of the ice detector circuit based at least in part on the current parameter, where the drive coil is coupled to a feedback coil that is configured to provide a feedback signal to a driver circuit to control the drive coil. Embodiments also include comparing the performance of the ice detector circuit and expected performance of the ice detector circuit, and providing a report based at least in part on the comparison.

20 Claims, 6 Drawing Sheets

(56) References Cited

U.S. PATENT DOCUMENTS

| | | | | |
|---|---|---|---|---|
| 6,304,194 B1 * | 10/2001 | McKillip | ............... | B64D 15/20 |
| | | | | 340/580 |
| 6,414,282 B1 | 7/2002 | Ice et al. | | |
| 9,334,063 B2 | 5/2016 | Baumgarten et al. | | |
| 9,684,068 B2 | 6/2017 | Schumann et al. | | |
| 9,776,731 B1 | 10/2017 | Lieberman et al. | | |
| 9,885,761 B2 | 2/2018 | Schram | | |
| 10,099,791 B2 | 10/2018 | Borigo et al. | | |
| 2017/0243413 A1 | 8/2017 | Haggerty et al. | | |
| 2018/0221921 A1 | 8/2018 | Magee et al. | | |
| 2018/0275185 A1 | 9/2018 | Essawy et al. | | |
| 2018/0299410 A1 * | 10/2018 | Merrill | ................... | G01N 29/30 |

OTHER PUBLICATIONS

Extended European Search Report; European Application No. 20150262. 2; Application Filed: Jan. 3, 2020; dated Jun. 15, 2020; 7 pages.

* cited by examiner

REAL-TIME PERFORMANCE AND HEALTH MONITORING OF ICE DETECTOR SYSTEMS AND ESTIMATION OF REMAINING USEFUL LIFE

CROSS-REFERENCE TO RELATED APPLICATIONS

This application claims the benefit of Indian Application No. 201911000666 filed Jan. 7, 2019, which is incorporated herein by reference in its entirety.

BACKGROUND

Embodiments are generally related to ice detection systems, and more specifically to real-time performance and health monitoring of an ice detector system and remaining useful life estimation.

Ice detector probe can be used for detecting ice accumulation in a variety of systems. One such system includes aircraft where the ice detector probes can be located in different locations. Ice detector probes are equipped with sensors located in the ice detector probe which can vibrate at a certain resonating frequency under normal conditions. These ice detector probes are exposed to the external environment of the aircraft during flight and responsive to ice accumulation, the resonating frequency of the sensor of the ice detector probe can change which indicates ice accumulation. Because these ice detector probes and struts are exposed to the environment including extreme weather conditions they are prone to continuous ice accumulation. They are equipped with electrical heaters to provide heat for the ice detector probes and struts to melt the ice. There may be a need to implement and optimized condition based monitoring, prognostics, and diagnostics for monitoring the ice detector system to improve the system's availability and safety.

BRIEF DESCRIPTION

According to an embodiment, an ice detector system including a storage medium, the storage medium being coupled to a processor, and an ice detector unit is provided. The ice detector unit includes an ice detector probe, a drive coil to control the resonant frequency of the ice detector probe, and a driver circuit coupled to the drive coil. The ice detector unit also includes a current sensor configured to detect a current parameter provided to the drive coil during operation, a feedback coil configured to provide a feedback signal to the driver circuit to control the drive coil, and a capacitor coupled to the feedback coil and the drive circuit, wherein the capacitor determines a resonant frequency of the ice detector probe.

In addition to one or more of the features described herein, or as an alternative, further embodiments can include a processor that analyzes a performance of the ice detector probe based on the current parameter, and transmits performance data of the ice detector probe to the storage medium for storage.

In addition to one or more of the features described herein, or as an alternative, further embodiments can include a drive coil that is an inductor type coil and the feedback coil is an inductor type coil.

In addition to one or more of the features described herein, or as an alternative, further embodiments can include a processor that is further configured to estimate a parameter value and compare the parameter value to initial values to calculate a drift value.

In addition to one or more of the features described herein, or as an alternative, further embodiments can include a processor that is further configured to obtain a plurality of drift values and generate a drift trend based on a delta between initial parameter values and measured parameter values.

In addition to one or more of the features described herein, or as an alternative, further embodiments can include using initial parameter values and measured parameter values that are at least one of an inductance value of the drive coil or a capacitance value of the capacitor coupled to the feedback coil.

In addition to one or more of the features described herein, or as an alternative, further embodiments can include a processor that is further configured to estimate a remaining useful life for the ice detector probe based at least in part on the drift trend.

In addition to one or more of the features described herein, or as an alternative, further embodiments can include a processor that is further configured to generate an alert indicating the remaining useful life and performance of the ice detector probe.

In addition to one or more of the features described herein, or as an alternative, further embodiments can include a processor that resides in at least one of a maintenance device, a pilot device, or a copilot device.

According to another embodiment, a method for performing real-time performance and health monitoring of an ice detector system is provided. The method includes sensing, by a current sensor, a current parameter of a drive coil of an ice detector circuit, and monitoring a performance and health of the ice detector circuit based at least in part on the current parameter. The method also includes comparing the performance of the ice detector circuit and expected performance of the ice detector circuit, and providing a report based at least in part on the comparison.

In addition to one or more of the features described herein, or as an alternative, further embodiments can include calculating a performance of the ice detecting circuit based at least in part on the current parameter, determining a response of the magnitude of the current parameter as a function of frequency of the ice detector circuit, and comparing a measured frequency of the ice detector circuit to the determined response to determine the performance of the ice detector circuit.

In addition to one or more of the features described herein, or as an alternative, further embodiments can include calculating impedance characteristics for the ice detector circuit based on the current parameter of the drive coil, measuring a probe response during operation, and comparing the calculated impedance characteristics with the measured probe response.

In addition to one or more of the features described herein, or as an alternative, further embodiments can include determining an inductive failure or a capacitive failure of the ice detector circuit based on comparing the calculated impedance characteristics with the measured probe response.

In addition to one or more of the features described herein, or as an alternative, further embodiments can include estimating a parameter value and comparing the parameter value to an initial value to calculate a drift value of the ice detector circuit.

In addition to one or more of the features described herein, or as an alternative, further embodiments can include obtaining a plurality of drift values and generating a drift trend based on a delta between initial parameter values and measured parameter values.

In addition to one or more of the features described herein, or as an alternative, further embodiments can include using initial parameter values and measured parameter values that are at least one of an inductance value of a drive coil of the ice detector circuit or a capacitance value of the capacitor coupled to a feedback coil of the ice detector circuit.

In addition to one or more of the features described herein, or as an alternative, further embodiments can include estimating a remaining useful life for the ice detector probe based at least in part on the drift trend.

In addition to one or more of the features described herein, or as an alternative, further embodiments can include generating a report indicating the remaining useful life and performance for the ice detector probe.

In addition to one or more of the features described herein, or as an alternative, further embodiments can include generating the report based at least in part on exceeding a configurable threshold value for operational limits of the ice detector circuit.

In addition to one or more of the features described herein, or as an alternative, further embodiments can include monitoring that is performed by a processor, wherein the processor is located in at least one of a maintenance device, a pilot device, or a copilot device.

BRIEF DESCRIPTION OF THE DRAWINGS

The following descriptions should not be considered limiting in any way. With reference to the accompanying drawings, like elements are numbered alike.

DETAILED DESCRIPTION

Ice detector systems include a plurality of elements such as a drive coil, feedback coil, and sensing element biasing magnet which makes the sensor in the ice detector probe vibrate axially at its natural frequency and changes due to ice accumulation. These components can degrade over time and can fail abruptly leading to delay and added costs such as maintenance and downtime.

Ice detector systems can suffer from abrupt field failures when in service leading to down time, added cost of maintenance and necessity to maintain big inventory.

The detectors are prone to failure because they are exposed to the harsh weather environment during operation. The performance of the ice detector systems is not continuously monitored and revalidated once an ice probe is in the field resulting into icing related false annunciation and warning for pilots. Current systems do not enable real-time monitoring of parameters related to the ice detector system.

Figure 1:
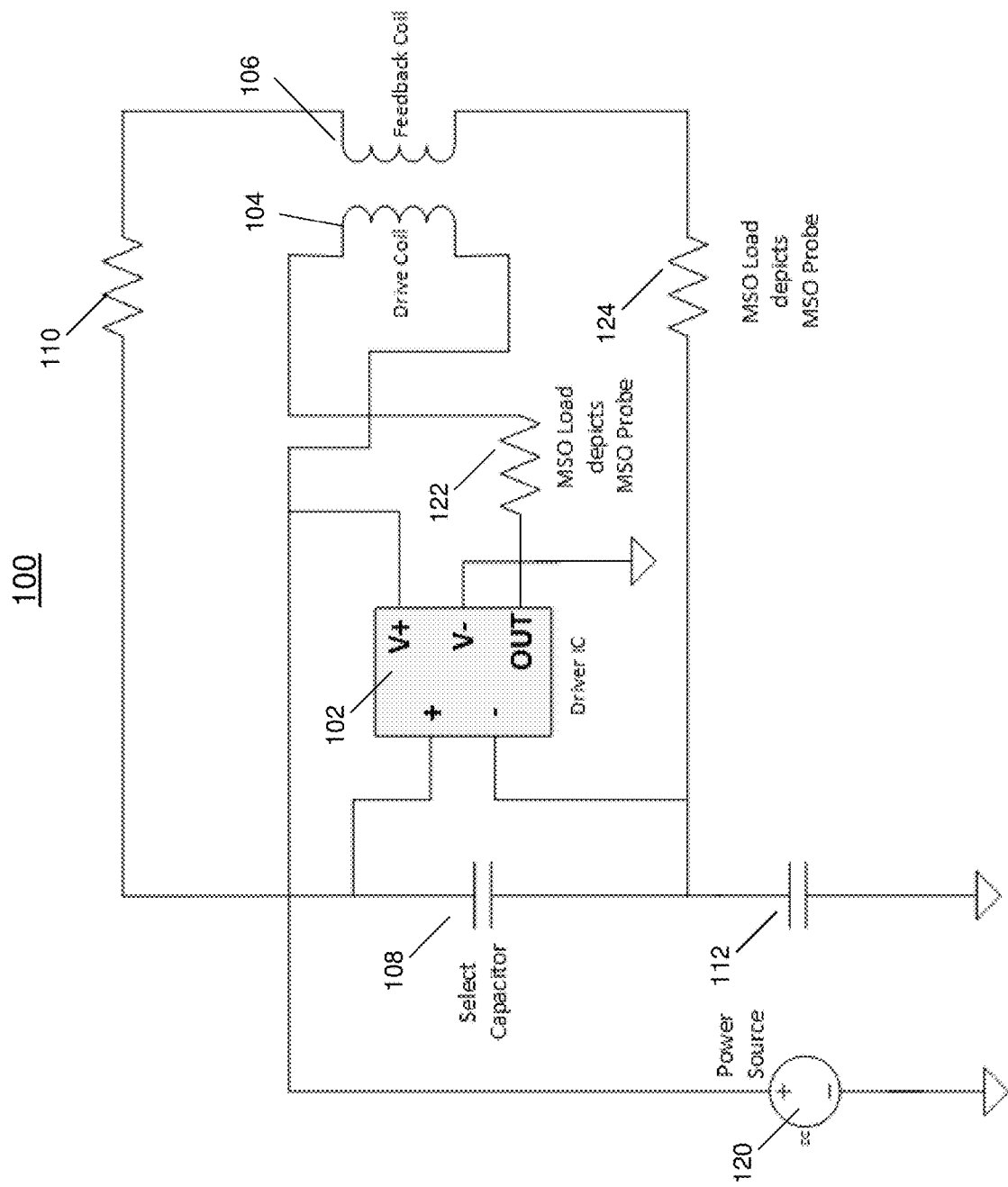
FIG. 1 depicts an ice detection system.

Now referring to FIG. 1, a prior art system 100 for performing ice detection is shown. The system 100 also includes a power source 120 that is used to supply power to the circuit 100. The system 100 includes a driver circuit 102 that is coupled to a drive coil 104. The drive coil 104 can be an inductor type drive coil that is configured to drive a probe for generating a specific resonant frequency for detecting ice accumulation on a structure. The load provided by the probes are represented by the resistors 122, 124. A feedback coil 106 is coupled to the drive coil 104 to generate a feedback signal that is provided to the drive circuit 102. The drive circuit 102 uses the feedback signal to control the drive coil 104.

The select capacitor 108 is configured to tune the circuit 100 for generating a specified resonant frequency based on the drive coil 104. If there is any change in the resonating frequency that is detected beyond a threshold ice accretion is detected. Subsequently, a heater for de-icing the probe, strut, or other ice protection system can be activated. For example, if the resonant frequency falls below a threshold, the heating device can be triggered.

The system 100 also includes a resistor 110 that is coupled between the power source 120 and the feedback coil 106 and a capacitor 112.

Existing ice detection systems, the failure of ice detectors are only alerted when the sensing circuit performance exceeds acceptable operation limits (complete failure) or other failure event occurs such as loss of power, a watchdog failure, heater failure, etc. There are currently no techniques that allow for detecting any deviation in the frequency is not monitored unless it drifts beyond a threshold range and fails.

Present ice detector units are equipped with non-volatile memory to save detected data from the ice detector units. These ice detector systems can include serial interfaces to communicate with another computing device where the collected data and fault data from the ice detector units are downloaded to the computing device. These ice detector unit's failures are only detected when an alarm is triggered. In addition, the data must be manually downloaded from the system.

The techniques described herein incorporated a current sensing circuit in the ice detection system to acquire critical parameters of the resonating element of the ice detector probe to monitor the performance and health of the ice detection system. The techniques described herein provide algorithms and methods for storing and analyzing the monitored parameters for diagnostics and prognostics. In addition, the techniques described herein provide for identifying the degradation in sensing of parameters and analyzing a degradation trend, predicting the remaining useful life for the sensing subsystem. There may be a need for continuously monitoring the ice detector probes and storage of field performance, fault, and failure data to perform detailed diagnostics and prognostics. In addition, the remaining useful life of the ice detector probe can be calculated.

Figure 2:
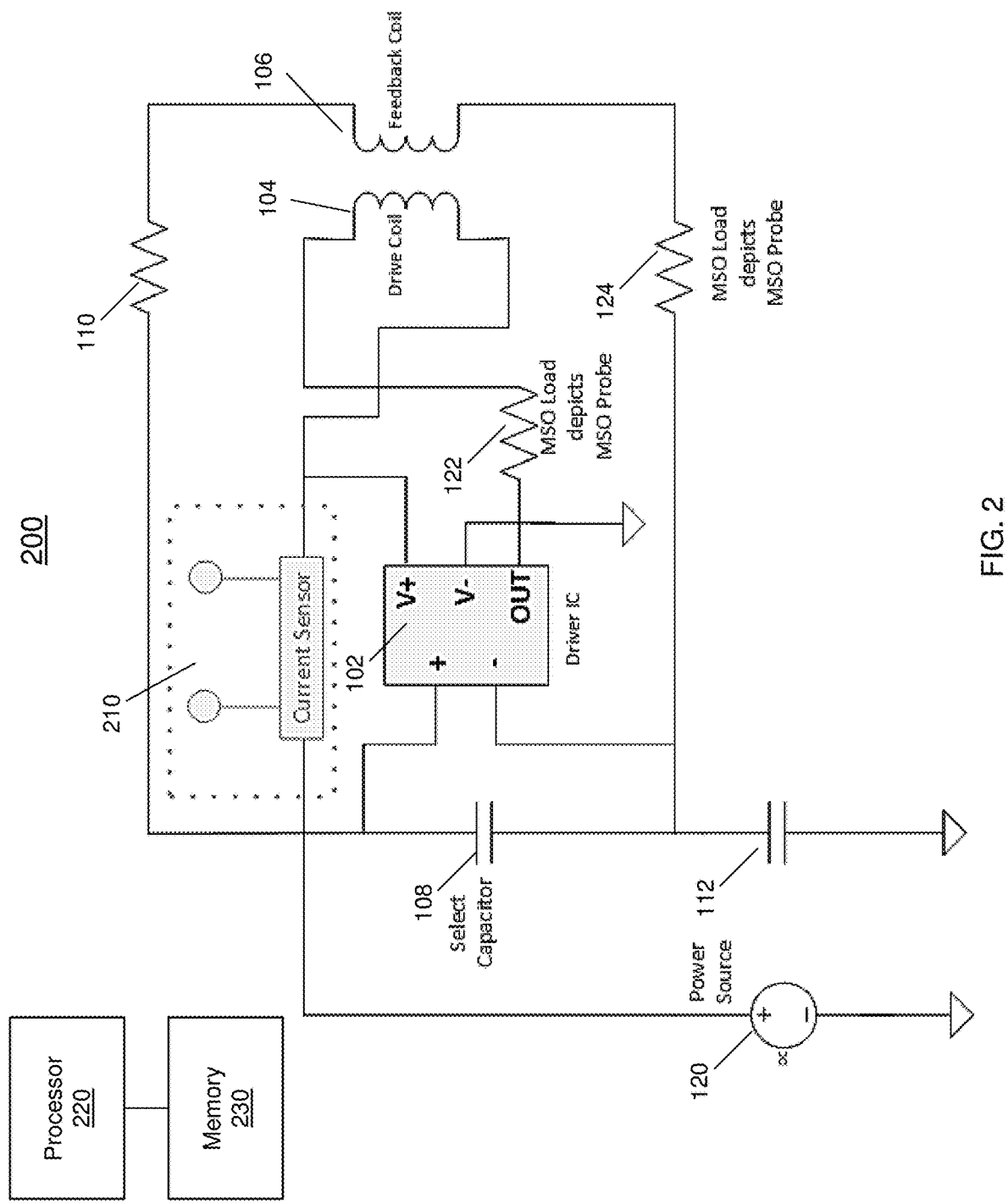
FIG. 2 depicts a system for performing real-time performance and health monitoring of an ice detector system and estimation of remaining useful life in accordance with one or more embodiments.

Now turning to FIG. 2, a circuit for performing real-time performance and health monitoring of an ice detector system is shown. The circuit 200 includes a current sensor 210 that is coupled to the power source 120 and the drive coil 104. The current sensor 210 monitors the current provided to the drive coil 104 during operation. In one or more embodiments, the measured value of the current is used to derive the inductance of the drive coil and the capacitance value of the select capacitor.

The memory 230 can be configured to store data such as but not limited the resonating frequency of the sensing element of the ice detector probe, current and voltage values, heater related parameters, timing, etc. The detectors can include magnetostrictive oscillator sensors (MSO). The data can be collected during a built-in test or during normal operation of the probe for monitoring of the functioning of the probe and for maintenance.

In one or more embodiments, the software model can be implemented in a processor 220 such as that shown in FIG. 2 where the software model learns from the input sources and updates the software model to provide better accuracy to predict the remaining life of the ice detector. The data can map the measured values for the response, capacitor values, inductance values, failure data, alarm, data, etc. and map the information over a period of time when one or more ice detector devices actually fail. As more and more data becomes available, the results can be used to provide a real-time status used to predict the remaining life. Patterns or trends that identify the ice detector is beginning to fail can be used to predict when the actual failure is likely to occur. This allows a technician or operator to exchange one or more components of the ice detector system prior to failure to avoid any unexpected downtime.

Figure 3:
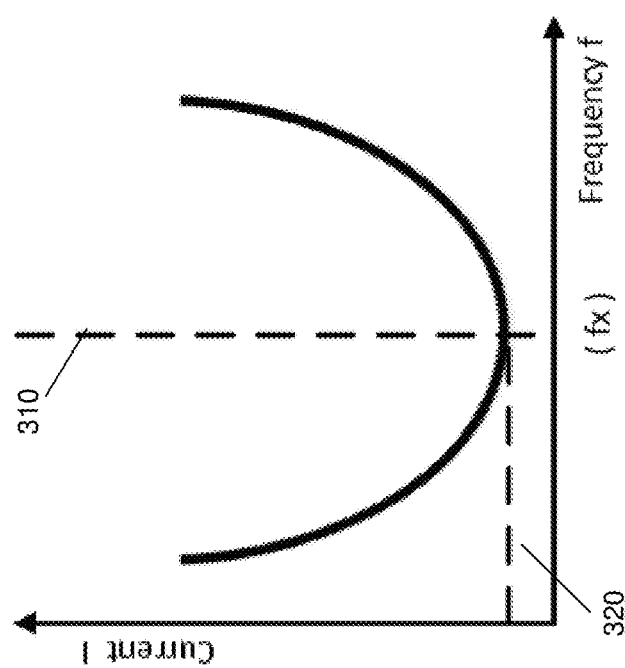
FIG. 3 depicts a plot indicating the relationship between current and frequency in the ice detector system.

Now referring to FIG. 3, the curve 300 illustrates the magnitude of the current that is provided to the drive coil is a function of frequency detected by the sensing element in the ice detector probe. In one or more embodiments, the frequency/current response of the circuit for a specific ice detector probe can be generated from empirical studies and calculations to determine the expected results. These results can be stored in memory such as the memory shown in FIG. 2 where the results can be compared to the actual measured probe response during operation. The dash vertical line 310 indicates the resonant frequency (fx) of the ice detector probe and the dashed horizontal line 320 indicates the minimum current I that occurs at the resonant frequency (fx). The drift or difference in real values are measured and used for calculating the performance and health of the ice detector probe which is further described below with reference to FIG. 4.

Figure 4:
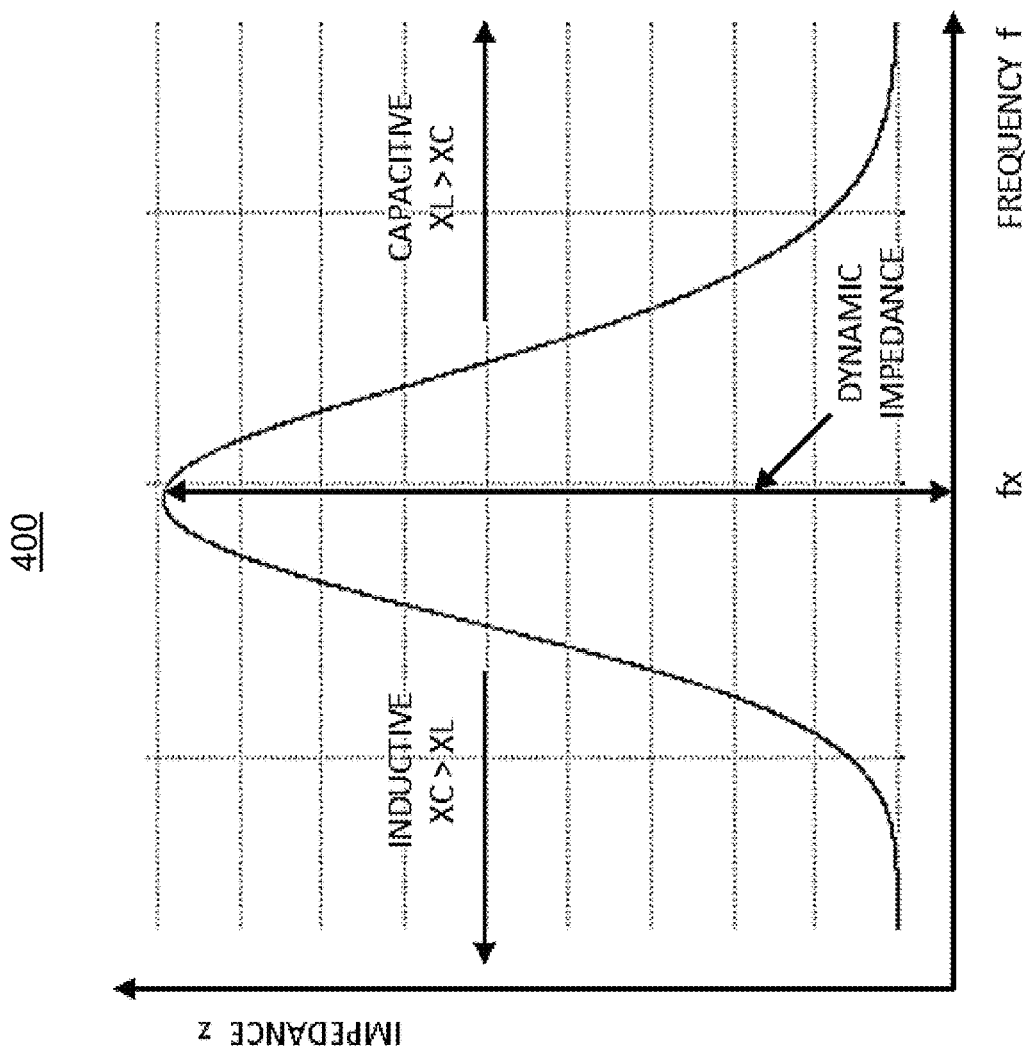
FIG. 4 depicts a plot indicating the relationship between impedance and frequency in the ice detector system.

FIG. 4 depicts a curve 400 that provides the response for the frequency-impedance function. In one or more embodiments, the impedance in the resonance circuit is calculated using the data measured by the current sensor. The following calculations can be used to calculate the characteristics and parameters of the system. The total current across the MSO circuit is given by Equation 1 which provides:

$$I_T = I_c + I_L \quad \text{(Eq. 1)}$$

where $I_T$ is total current across current sensor; $I_C$ is current across select capacitor; $I_L$ is current across drive coil (inductor). The terminal voltage across the MSO circuit is given by Equation 2 which provides:

$$V_T = V_C = V_L \quad \text{(Eq. 2)}$$

where $V_T$ is the terminal voltage from power source; $V_C$ is voltage across select capacitor; and $V_L$ is voltage across drive coil (inductor). The differential of the MSO Circuit shown in FIG. 2 is represented as by Equation 3 which provides:

$$\frac{d^2 V_T}{dx} + \frac{1}{LC} I_T(t) = 0 \quad \text{(Eq. 3)}$$

where $$\omega_{cal} = \frac{1}{LC};$$

C is select capacitor value; L is drive coil (inductor) value. Therefore, substituting the calculated angular frequency, Equation 4 provides:

$$\frac{d^2 V_T}{dx} + \omega_{cal} \cdot I_T(t) = 0 \quad \text{(Eq. 4)}$$

where t is time; $\omega_{cal}$ is angular frequency which is calculated using current sensor measurement. Calculating the frequency as shown in Equation 5 provides:

$$F_{CAL} = \frac{1}{2\pi \sqrt{LC}} \quad \text{(Eq. 5)}$$

In a scenario, if Fcal>fx, the inductance value is computed using Equation 1 by using the design value for C. In a different scenario, if Fcal<fx the capacitance value is computed using Equation 1 using the design value for L. Further discussion of the inductance and capacitance values are provided below.

The inductive and capacitive impedance characteristics with respect to the resonance frequency of the ice detector probe are shown below. These values are used to evaluate the ice detector probe for any change in its behavioral operation or drive from normal operation. The initial values for the capacitance and the inductance when the ice detector probe was first operated can be compared to the estimated/calculated values to determine the drift experienced by the ice detector probe. The frequency-impedance function can be calculated using known techniques and stored in memory for subsequent analysis.

As shown, at f0, the current is at a minimum and the total impedance is at a maximum. In this state, the ice detection system is operating as a rejecter circuit. If the frequency is determined to be less than the resonance frequency the circuit is operating in an inductive state. If the frequency is greater than the resonance frequency the circuit is in a capacitive state. The ideal response that can be calculated from empirical studies can be compared to the actual performance of the probe. In one or more embodiments, the drift of the circuit can be monitored over a period of time and used for calculating the remaining life of the ice detector probe.

Figure 5:
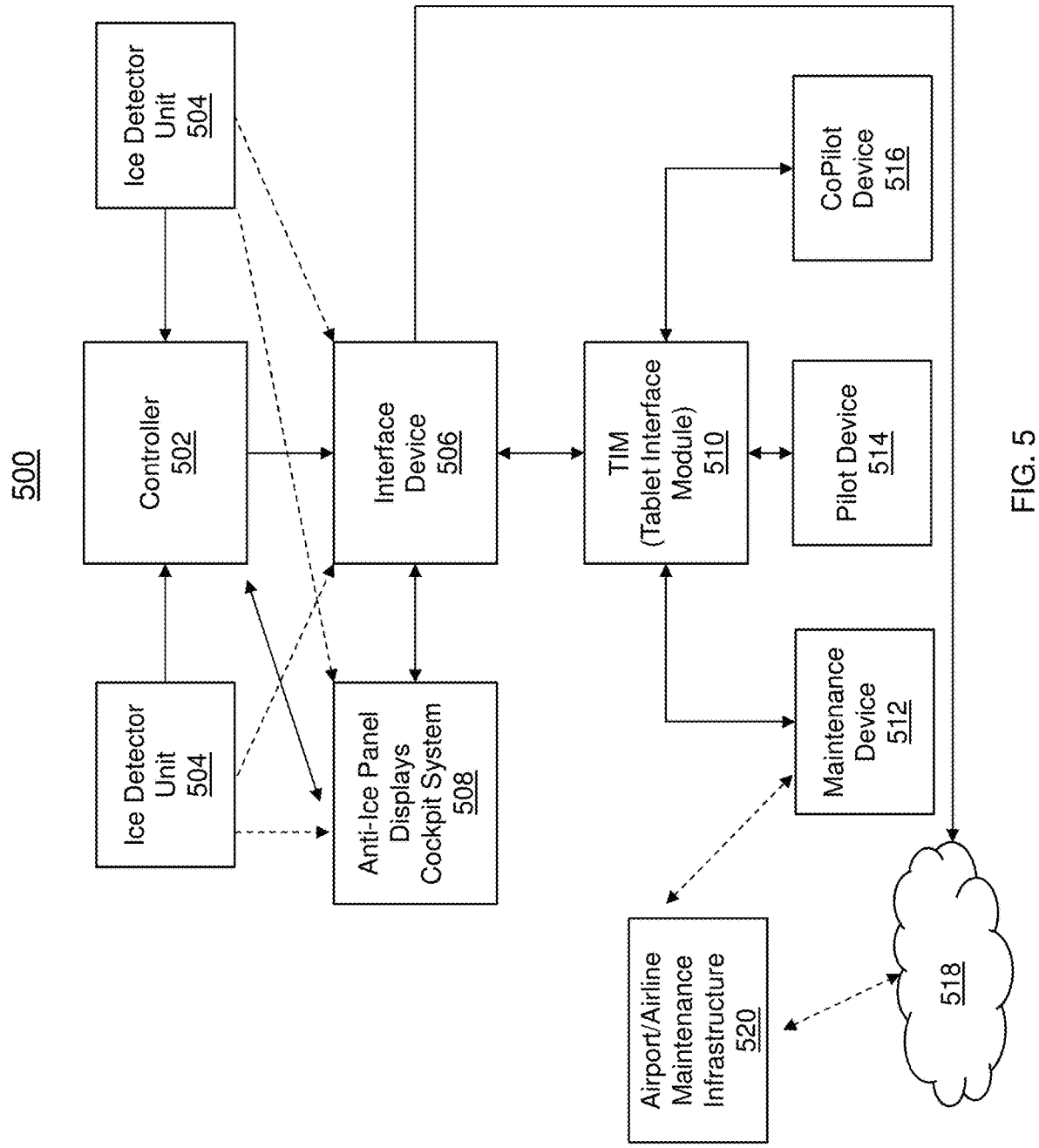
FIG. 5 depicts an ice detection system in accordance with one or more embodiments.

Now referring to FIG. 5, a system for performing real-time performance and health monitoring of an ice detector system and remaining useful life estimation is shown. The system 500 can include a controller 502 that is coupled to one or more ice detector units 504. The ice detector units 504 can be located in various structures of the aircraft and are configured to communicate ice detector parameters such as the resonance frequency, current data, impedance information, etc. to the controller 502. The controller 502 can also be coupled to an interface device 506 to exchange the health parameter data.

The interface device 506 is configured to communicate the health parameters directly with the ice detectors unit 504 or through the controller 502. The interface device 506 is coupled to an anti-ice panel display cockpit system 508 which can display graphical and/or textual information regarding the operational status of the ice detection system. The interface device 506 can communicate with the airport/airline maintenance infrastructure 520 over a network 518. In one or more embodiments, the network 518 can be configured as a cloud network. The interface device 506 is configured to communicate with a tablet interface module (TIM) 510. The TIM 510 can be configured to exchange data with one or more devices/systems such as a maintenance device 512, a pilot device 514, and a co-pilot device 516. In one or more embodiments, the maintenance device 512, a pilot device 514, and co-pilot devices 516 can include applications for analyzing the performance and health parameters of the ice detection system and can provide the assessment report for the performance and health condition. The remaining useful life and other maintenance alerts can be reported. The maintenance device 512 can be configured to communicate with an airport/airline maintenance infrastructure to schedule or perform maintenance. In some embodiments, the real-time performance monitoring and health management application can be mounted inside the ice detector and/or ice controller unit.

In one or more embodiments, the assessment application can include multiple functionalities. For example, the techniques described herein can include monitoring the ice detector system parameters and comparing the parameters with models for identifying the drift experienced by the system. The change in drift patterns can be monitored over a period of time to predict when the sensed value is operating outside of the threshold of nominal functioning. The reports can be generated and can include data such as faults, failures, performance, degradation, prognostics, diagnostics, etc.

Figure 6:
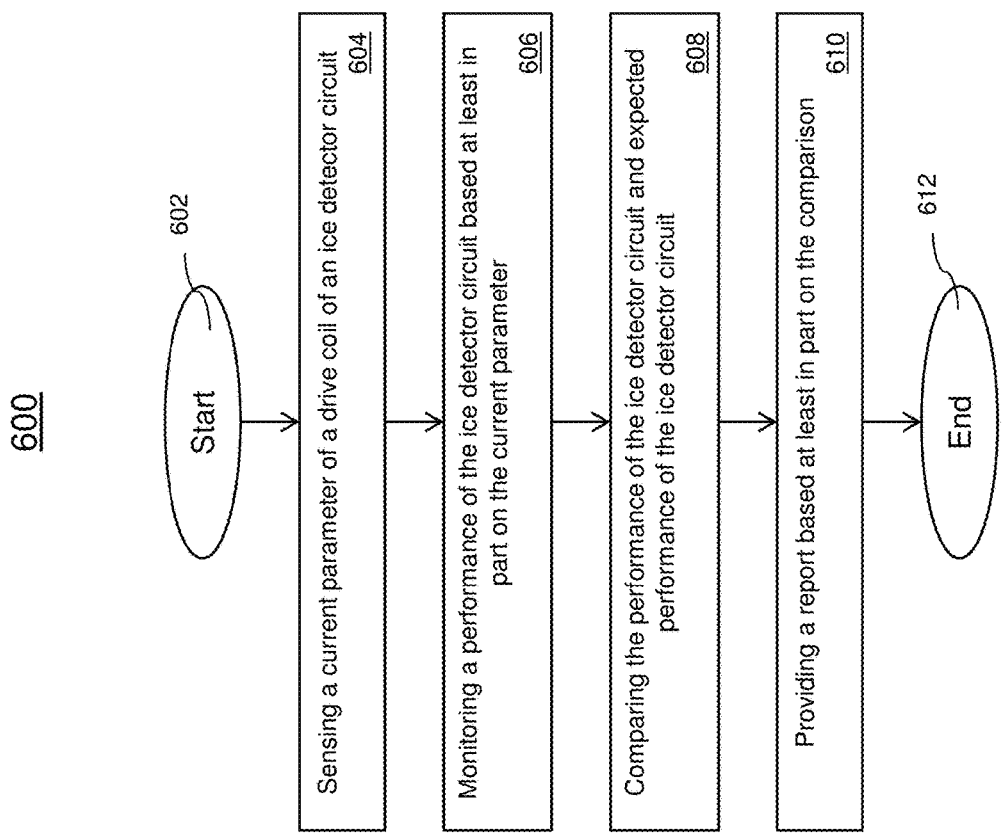
FIG. 6 depicts a flowchart of a method for performing real-time performance and health monitoring of an ice detector system and estimation of remaining useful life in accordance with one or more embodiments.

FIG. 6 depicts a flowchart of a method for performing real-time monitoring of ice detection system. The method 600 can be implemented in a system such as that shown in FIGS. 2 and 5. It should be appreciated that the method 600 can also be implemented in systems having a different architecture and/or configuration of elements. The method 600 begins at block 602 and continues to block 604 which provides for sensing a current parameter of a drive coil of an ice detector circuit. Block 606 provides for monitoring a performance of the ice detector circuit based at least in part on the current parameter. The method 600 continues to block 608 which provides for comparing the performance of the ice detector circuit and expected performance of the ice detector circuit. Block 610 includes providing a report based at least in part on the comparison. In one or more embodiments, the report can be provided based on a threshold that indicates the normal operating range of the ice detecting probe. The method 600 can end at block 612 or can repeat one or more steps of the process.

The technical effects and benefits include performing real-time monitoring of the ice detection system during operation. The technical effects and benefits also include identifying a particular issue occurring within the ice detection system. Finally, the technical effects and benefits include identifying trends in operation to determine the remaining useful life of one or more components of the ice detection system.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An ice detector system comprising:
   a storage medium, the storage medium being coupled to a processor; and
   an ice detector unit comprising:
      an ice detector probe;
      a drive coil to control the resonant frequency of the ice detector probe;
      a driver circuit coupled to the drive coil;
      a current sensor configured to detect a current parameter provided to the drive coil during operation;
      a feedback coil configured to provide a feedback signal to the driver circuit to control the drive coil; and
      a capacitor coupled to the feedback coil and the drive circuit, wherein the capacitor determines a resonant frequency of the ice detector probe.

2. The system of claim 1, wherein the processor is configured to:
   analyze a performance of the ice detector probe based on the current parameter; and
   transmit performance data of the ice detector probe to the storage medium for storage.

3. The system of claim 1, wherein the drive coil is an inductor type coil and the feedback coil is an inductor type coil.

4. The system of claim 1, wherein the processor is further configured to estimate a parameter value and compare the parameter value to initial values to calculate a drift value.

5. The system of claim 4, wherein the processor is further configured to obtain a plurality of drift values and generate a drift trend based on a delta between initial parameter values and measured parameter values.

6. The system of claim 5, wherein the initial parameter values and the measured parameter values are at least one of an inductance value of the drive coil or a capacitance value of the capacitor coupled to the feedback coil.

7. The system of claim 4, wherein the processor is further configured to estimate a remaining useful life for the ice detector probe based at least in part on the drift trend.

8. The system of claim 7, wherein the processor is further configured to generate an alert indicating the remaining useful life and performance of the ice detector probe.

9. The system of claim 1, wherein the processor resides in at least one of a maintenance device, a pilot device, or a copilot device.

10. A method for performing real-time performance and health monitoring of an ice detector system, the method comprising:
   sensing, by a current sensor, a current parameter of a drive coil of an ice detector circuit;
   monitoring a performance and health of the ice detector circuit based at least in part on the current parameter;
   comparing the performance of the ice detector circuit and expected performance of the ice detector circuit; and
   providing a report based at least in part on the comparison.

11. The method of claim 10, further comprising calculating a performance of the ice detecting circuit based at least in part on the current parameter;
   determining a response of the magnitude of the current parameter as a function of frequency of the ice detector circuit; and
   comparing a measured frequency of the ice detector circuit to the determined response to determine the performance of the ice detector circuit.

12. The method of claim 10, further comprising calculating impedance characteristics for the ice detector circuit based on the current parameter of the drive coil;
   measuring a probe response during operation; and
   comparing the calculated impedance characteristics with the measured probe response.

13. The method of claim 12, further comprising determining an inductive failure or a capacitive failure of the ice detector circuit based on comparing the calculated impedance characteristics with the measured probe response.

14. The method of claim 10, further comprising estimating a parameter value and comparing the parameter value to an initial value to calculate a drift value of the ice detector circuit.

15. The method of claim 14, further comprising obtaining a plurality of drift values and generating a drift trend based on a delta between initial parameter values and measured parameter values.

16. The method of claim 15, wherein the initial parameter values and the measured parameter values are at least one of an inductance value of a drive coil of the ice detector circuit or a capacitance value of the capacitor coupled to a feedback coil of the ice detector circuit.

17. The method of claim 15, further comprising estimating a remaining useful life for the ice detector probe based at least in part on the drift trend.

18. The method of claim 17, further comprising generating a report indicating the remaining useful life and performance for the ice detector probe.

19. The method of claim 18, further comprising generating the report based at least in part on exceeding a configurable threshold value for operational limits of the ice detector circuit.

20. The method of claim 10, wherein the monitoring is performed by a processor, wherein the processor is located in at least one of a maintenance device, a pilot device, or a copilot device.

* * * * *